(12) United States Patent
Zhang et al.

(10) Patent No.: US 12,107,786 B2
(45) Date of Patent: Oct. 1, 2024

(54) METHOD FOR TRACKING REFERENCE SIGNAL (TRS) ENHANCEMENT

(71) Applicant: Apple Inc., Cupertino, CA (US)

(72) Inventors: Yushu Zhang, Beijing (CN); Dawei Zhang, Saratoga, CA (US); Haitong Sun, Cupertino, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/440,103

(22) PCT Filed: Feb. 12, 2020

(86) PCT No.: PCT/CN2020/074933
§ 371 (c)(1),
(2) Date: Sep. 16, 2021

(87) PCT Pub. No.: WO2021/159337
PCT Pub. Date: Aug. 19, 2021

(65) Prior Publication Data
US 2022/0376855 A1     Nov. 24, 2022

(51) Int. Cl.
*H04L 5/00*     (2006.01)
*H04L 1/1867*   (2023.01)

(52) U.S. Cl.
CPC .......... *H04L 5/0048* (2013.01); *H04L 1/1896* (2013.01)

(58) Field of Classification Search
CPC ............................ H04L 5/0048; H04L 1/1896
(Continued)

(56) References Cited

U.S. PATENT DOCUMENTS

| | | |
|---|---|---|
| 2019/0052443 A1 | 2/2019 | Cheng et al. |
| 2019/0116012 A1 | 4/2019 | Nam et al. |
| 2022/0393809 A1* | 12/2022 | Gao ...................... H04W 72/21 |

FOREIGN PATENT DOCUMENTS

| | | |
|---|---|---|
| WO | 2019067925 A1 | 4/2019 |
| WO | 2019195171 A1 | 10/2019 |

OTHER PUBLICATIONS

International Search Report and Written Opinion of the International Searching Authority directed to related International Patent Application No. PCT/CN2020/074933, mailed Aug. 3, 2020; 7 pages.

(Continued)

*Primary Examiner* — Obaidul Huq
(74) *Attorney, Agent, or Firm* — Sterne, Kessler, Goldstein & Fox P.L.L.C.

(57) ABSTRACT

Some embodiments include an apparatus, method, and computer program product for tracking reference signal (TRS) support of high speed use cases of 5G communications in a single frequency network (SFN), where a user equipment (UE) can measure a Doppler offset of a combined signal from two or more transmission reception points (TRPs) of the 5G communications system. A 5G node B (gNB) node can transmit a periodic, semi-persistent (SP), or aperiodic TRS with high measurement density that the UE uses to measure a Doppler offset of a combined signal. For example, the gNB can: trigger the aperiodic TRS based on a downlink assignment; and/or use lower layer signaling to arrange to transmit a semi-persistent TRS or a periodic TRS with a reduced periodicity. In some embodiments, the gNB can measure the Doppler offset based on an uplink signal, and transmit a TRS based on a pre-compensated Doppler frequency.

20 Claims, 11 Drawing Sheets

(58) Field of Classification Search
USPC .............................. 370/310, 328, 329
See application file for complete search history.

(56) References Cited

OTHER PUBLICATIONS

Spreadtrum Communications, "Remaining Issues on TRS," 3GPP TSG RAN WGI Meeting 90bis, R1-1717747, Oct. 8, 2017; Retrieved Sep. 14, 2021; 6 pages.
Intel Corporation, "Remining Details on TRS," 3GPP TSG RAN WGI Meeting 90bis, R1-1717376, Oct. 3, 2017; Retrieved Sep. 14, 2021; 4 pages.
Extended European Search Report directed to related European Application No. 20918804.4, issued Jun. 21, 2023; 17 pages.
Samsung, "Summary of email Discussion for Rel. 17 enhancements on MIMO for NR," 3GPP TSG RAN Meeting #86, Sitges, Spain, Dec. 9-12, 2019, RP-192435; 31 pages.
ZTE, "Detailed design of HARQ-ACK bundling in HD-FDD," 3GPP TSG RAN WG1 Meeting #86bis, Reno, USA Nov. 14-18, 2016, R1-1612595; 5 pages.

* cited by examiner

METHOD FOR TRACKING REFERENCE SIGNAL (TRS) ENHANCEMENT

This application is a U.S. National Phase of International Application No. PCT/CN2020/074933, filed Feb. 12, 2020, which is hereby incorporated by reference in its entirety.

BACKGROUND

Field

The described embodiments relate generally to 5G wireless communication, including high speed case uses.

Related Art 5G wireless communications systems include Channel State Information-Reference Signals (CSI-RS) for tracking user equipment (UE) connected to a 5G wireless network via a 5G node B (gNB), a 5G base station. The CSI-RS can include a Tracking Reference Signal (TRS) to facilitate fine time and frequency offset tracking. Difficulties arise in high speed use cases where the 5G wireless network employs single frequency network (SFN) mode.

SUMMARY

A 5G node B (gNB) can transmit a periodic Tracking Reference Signal (TRS) in a Channel State Information-Reference Signal (CSI-RS) to a user equipment (UE) that uses the periodic TRS to determine a Doppler offset. The UE uses the Doppler offset to decode data in a 5G transmission (e.g., a Physical Downlink Shared Channel (PDSCH)) that may have shifted in frequency due to a Doppler effect. In a high speed use case like a high speed train scenario where the UE is traveling at high speed between two or more transmission reception points (TRPs) (e.g., gNBs), the 5G wireless network employs single frequency network (SFN) mode to reduce the number of handoffs that the UE experiences. In SFN mode, the UE receives a combined signal at a same frequency where the combined signal includes contributions from at least two TRPs. When the UE uses the periodic TRS to determine and apply a Doppler offset to the combined TRP signals, the decoding is not successful because the Doppler offset of the combined signal at high speed changes much faster compared to the Doppler offset for a single TRP signal at high speed. In some solutions the periodicity of the periodic TRS is reduced so that the periodic TRS is sent more frequently. But that increases both network power consumption as well as UE power consumption.

Some embodiments include an apparatus, method, and computer program product for TRS support of high speed use cases of 5G communications in a SFN, where a UE can measure a Doppler offset of a combined signal from two or more TRPs of the 5G communications system. A gNB can transmit a periodic, semi-persistent (SP), or aperiodic TRS with high measurement density that the UE uses to measure a Doppler offset of a combined signal. For example, the gNB can: trigger the aperiodic TRS based on a downlink assignment; and/or use lower layer signaling to arrange to transmit a semi-persistent TRS or a periodic TRS with a reduced periodicity. In some embodiments, the gNB can measure the Doppler offset based on an uplink signal, and transmit a periodic TRS based on a pre-compensated Doppler frequency (e.g., with a phase shift.)

Some embodiments include a gNB, for example, receiving an uplink reference signal from a user equipment (UE), such as a smart phone, and first determining based at least on the uplink reference signal received, that a Doppler offset has satisfied a threshold. Satisfying the threshold can indicate that Doppler off set has changed much from the previous Doppler offset, and the UE may be moving at high speed. Based on the first determination, some embodiments include using a downlink assignment or a lower layer protocol to enable a periodic, SP, or an aperiodic TRS with high measurement density, and transmitting in an SFN, the periodic, SP, or aperiodic TRS to the UE. To transmit the aperiodic TRS, some embodiments include triggering the aperiodic TRS based on a downlink assignment, where the aperiodic TRS shares a same one or more quasi-co-located (QCL) parameters (e.g., share a same beam) with a Physical Downlink Shared Channel (PDSCH) signal triggered by the downlink assignment, where the aperiodic TRS enables the UE to decode the PDSCH signal that includes a combined signal from the gNB and device second gNB in the SFN.

Some embodiments include determining a slot offset for the aperiodic TRS, where the slot offset is the same as that of the PDSCH signal, transmitting a second consecutive slot that includes one or more aperiodic TRSs, and receiving a HARQ-ACK signal based on a last symbol of a last aperiodic TRS of the one or more aperiodic TRSs. Some embodiments include determining a slot offset for the aperiodic TRS, where the slot offset is different than a slot offset of the PDSCH signal, transmitting the aperiodic TRS in a first slot, transmitting a second consecutive slot that includes one or more aperiodic TRSs, and receiving a HARQ-ACK signal based on a last symbol of the PDSCH signal.

Some embodiments include using a Media Access Control (MAC) Control Element (CE) to activate the SP-TRS when the Doppler offset of a combined signal in a SFN is changing quickly. The minimal periodicity of the SP-TRS is less than or equal to that of the periodic TRS. When the Doppler offset is no longer changing quickly, some embodiments include using the MAC CE to deactivate the SP-TRS.

Some embodiments include using MAC CE or a Downlink Control Information (DCI) lower the periodicity of the periodic TRS when the Doppler offset for a combined signal is changing quickly; based on a second uplink reference signal received from the UE, determining that a second Doppler offset is no longer changing quickly, and using the MAC CE or DCI, raise the periodicity of the periodic TRS.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1A:
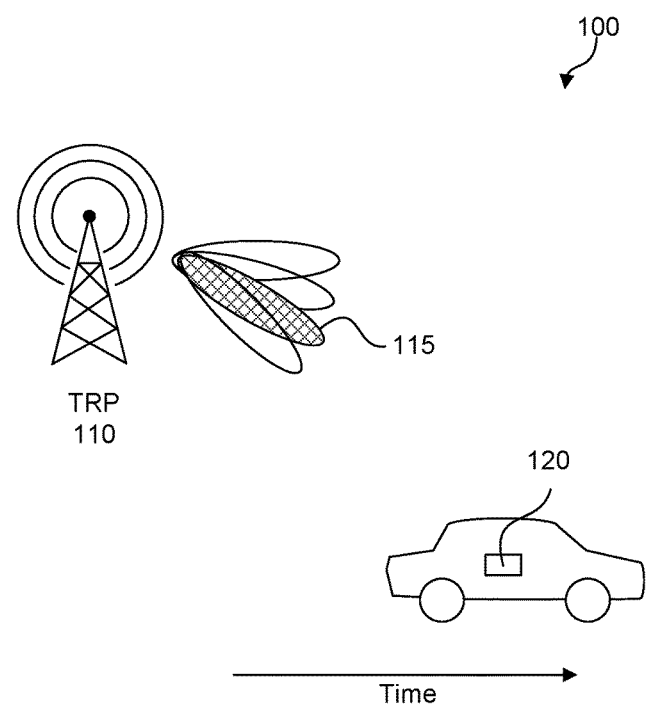
FIG. 1A illustrates an example system with a single transmission reception point (TRP), in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Wireless communication systems that support high speed use cases in single frequency network (SFN) mode experience problems due to Doppler offsets. For example, an electronic device of a user traveling on a high speed rail may have difficulty maintaining wireless services provided by a wireless communication system. FIG. 1A illustrates an example system 100 with a single transmission reception point (TRP) such as a 5G node B (gNB), in accordance with some embodiments of the disclosure. FIG. 1A is an example of a non-SFN system where user equipment (UE) 120 in a moving vehicle communicates with TRP 110 via beam 115. UE 120 receives a periodic Tracking Reference Signal (TRS) from TRP 110 and uses the periodic TRS to measure a Doppler offset. UE 120 uses the Doppler offset to decode Physical Downlink Shared Channel (PDSCH) signals transmitted from TRP 110 that may have shifted in frequency or phase due to a Doppler effect.

Figure 1B:
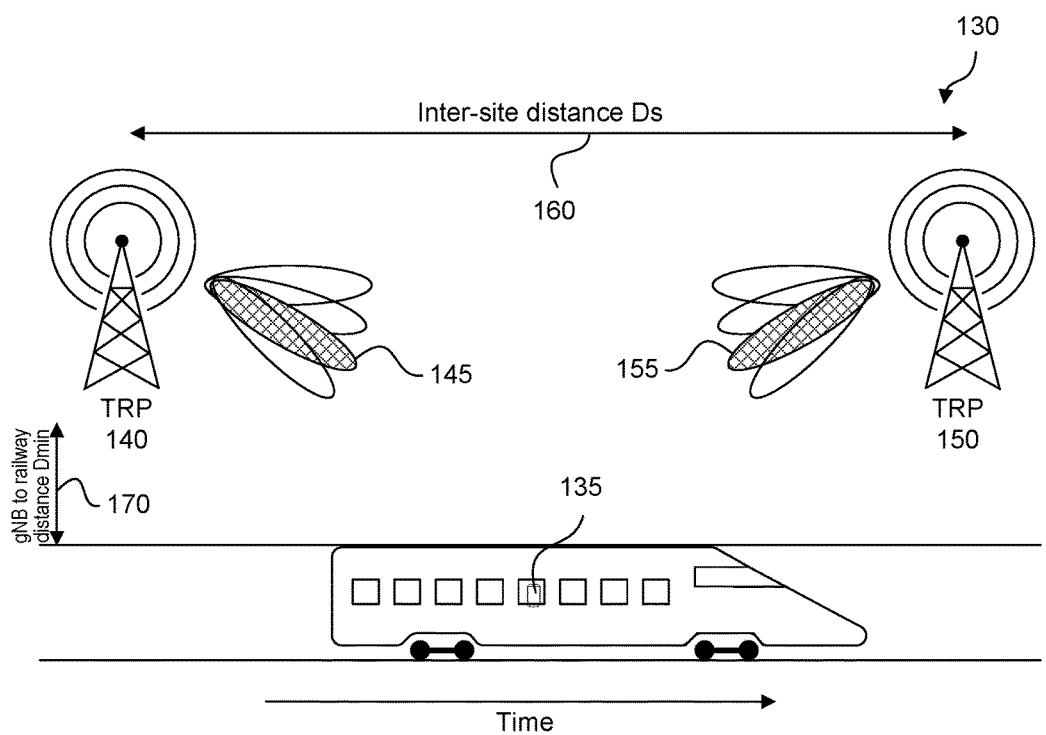
FIG. 1B illustrates an example system in single frequency network (SFN), in accordance with some embodiments of the disclosure.

FIG. 1B illustrates an example system 130 in a SFN, in accordance with some embodiments of the disclosure. The 5G wireless network includes two or more TRPs, but only TRP 140 and TRP 150 are depicted. Both TRP 140 and TRP 150 communicate with UE 135 located in a high speed train via beam 145 and beam 155, respectively on a single frequency. Thus, UE 135 receives a combined signal from both TRP 140 and TRP 150. In some embodiments there may be more than two TRPs (e.g., more than two gNBs.)

Figure 2:
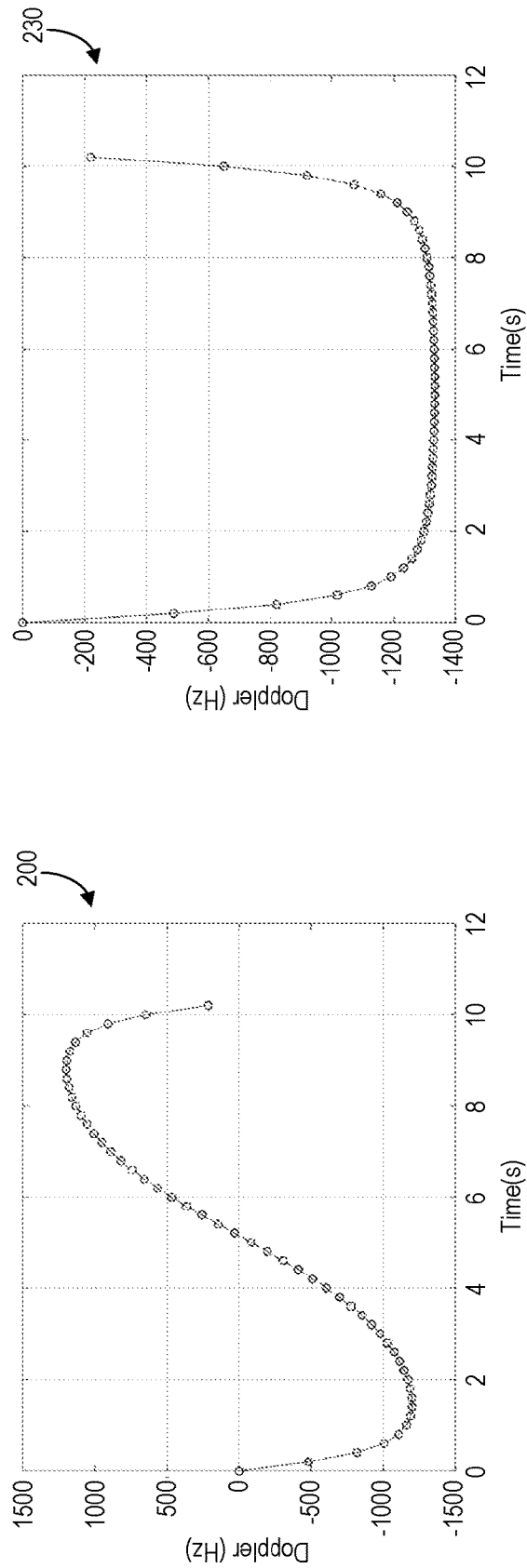
FIG. 2 illustrates diagrams of Doppler offset changes for single and combined TRP signals, in accordance with some embodiments of the disclosure.
Figure 2:
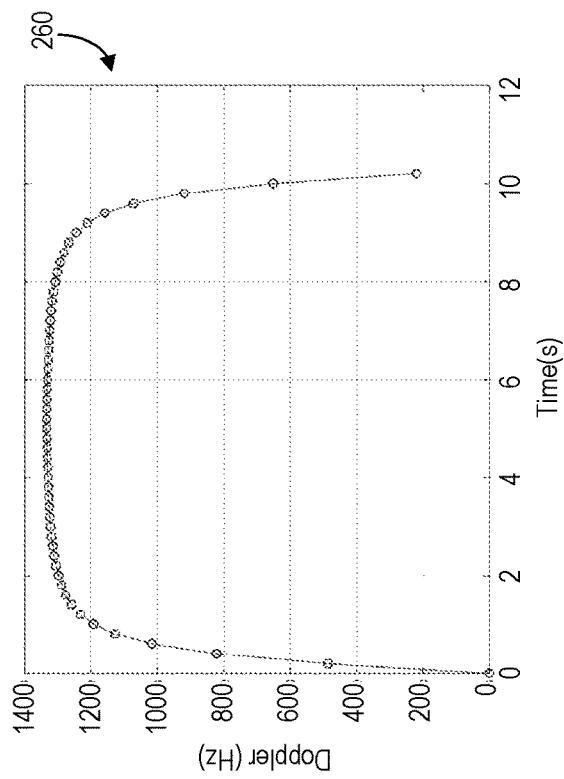

FIG. 2 illustrates diagrams of Doppler offset changes for single and combined TRP signals based on simulations using distances Ds 160, Dmin 170 of FIG. 1B, UE speed, and maximum Doppler offsets. Diagrams 230 and 260 demonstrate Doppler offset measurements from TRP 140 and TRP 150, respectively, that do not change quickly and are thus, reasonably accurate in decoding and obtaining downlink data. Diagram 200, however, illustrates that the Doppler offset from the combined signals from TRP 140 and TRP 150 changes quickly. Some solutions include reducing the periodicity of the periodic TRC so that periodic TRCs are sent more frequently, but those solutions increase network (E.g., TRP 140 and TRP 150) and UE 135 power consumption. UE 135 may be a computing electronic device such as a smart phone, cellular phone, and for simplicity purposes— may include other computing devices including but not limited to laptops, desktops, tablets, personal assistants, routers, monitors, televisions, printers, and appliances.

Figure 3:
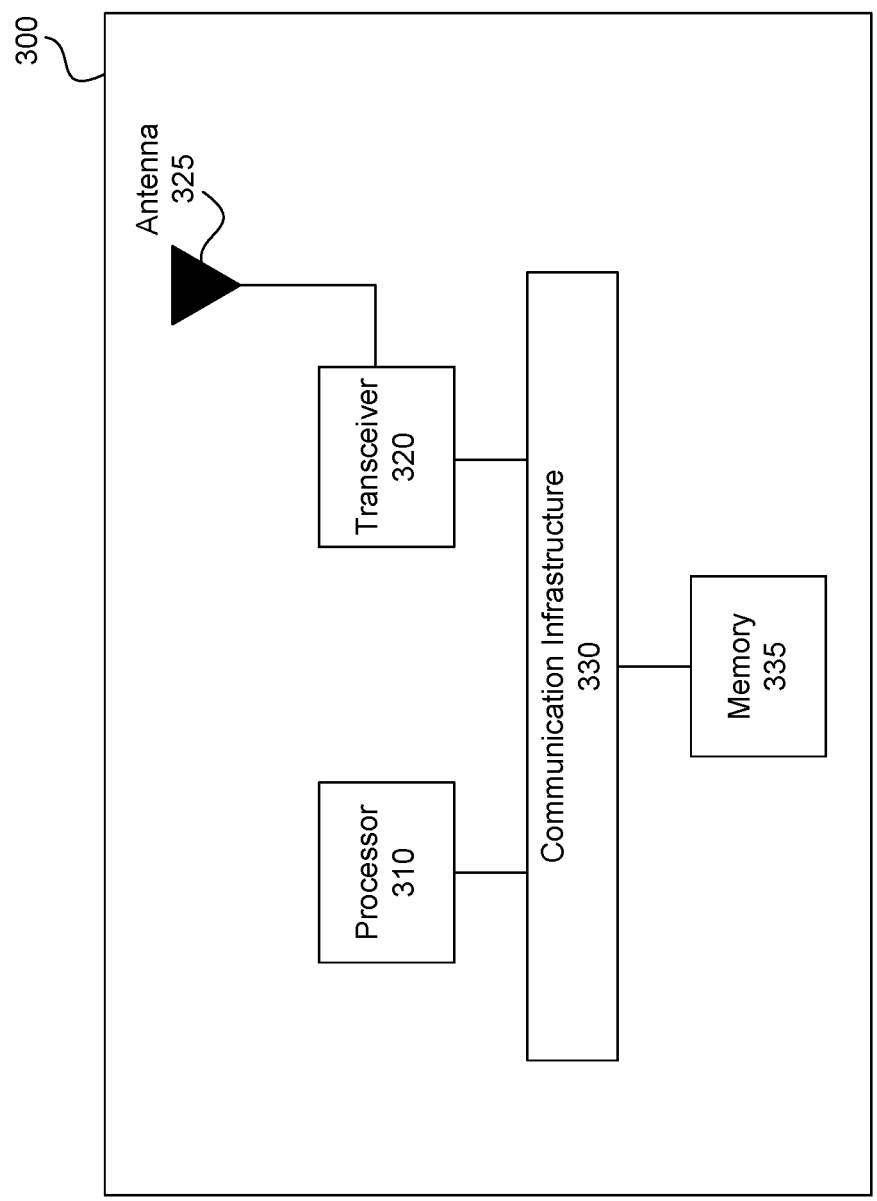
FIG. 3 illustrates a block diagram of an example wireless system for enhanced TRS in a SFN with combined signals, according to some embodiments of the disclosure.

Some embodiments include an apparatus, method, and computer program product for TRS support of high speed use cases of 5G communications in a SFN, where a user equipment UE can measure a Doppler offset of a combined signal from two or more TRPs of the 5G communications system. FIG. 3 illustrates a block diagram of an example wireless system 300 for enhanced TRS in a SFN with combined signals, according to some embodiments of the disclosure. As a convenience and not a limitation, FIG. 3, may be described with elements of FIG. 1B. System 300 can be a TRP 140, TRP 150, or UE 135 of FIG. 1B for example, where a TRP can be a gNB. System 300 may include processor 310, transceiver 320, communication infrastructure 330, memory 335, and antenna 325 that together perform operations enabling TRS support of high speed use cases of 5G communications in a SFN. Transceiver 320 transmits and receives 5G wireless communications signals and may be coupled to antenna 325. Communication infrastructure 330 may be a bus. Memory 335 may include random access memory (RAM) and/or cache, and may include control logic (e.g., computer software), computer instructions, and/or data. Processor 310, upon execution of the computer instructions, can be configured to perform the functionality described herein to address Doppler effects on TRS signals. Antenna 325 coupled to transceiver 320, may include one or more antennas that may be the same or different types.

To address the problem of a UE measuring a Doppler offset of a combined signal that changes quickly over time, a gNB can transmit a periodic or aperiodic TRS with high measurement density that the UE uses to measure a Doppler offset of a combined signal. For example, the gNB can: trigger the aperiodic TRS based on a downlink assignment or based on higher layer signaling. In another example, the gNB can use lower layer signaling to arrange to transmit a semi-persistent (SP)-TRS or a periodic TRS with a reduced periodicity. In some embodiments, the Channel State Information-Reference Signal (CSI-RS) is used to for transmitting the TRSs. In some embodiments, the Demodulation Reference Signal (DMRS) can be used for transmitting the TRSs.

In some embodiments, the UE measures a Doppler offset based on an aperiodic TRS based on a downlink assignment (e.g., Physical Downlink Control Channel (PDCCH). For example, the gNB can indicate in a Downlink Control Information (DCI) in a PDCCH signal that one or more aperiodic TRSs can be transmitted in a same beam (e.g., with a same quasi co-location (QCL)) with a Physical Downlink Shared Channel (PDSCH signal), where the PDSCH signal is triggered by the same downlink assignment (e.g., same PDCCH.)

Figure 4:
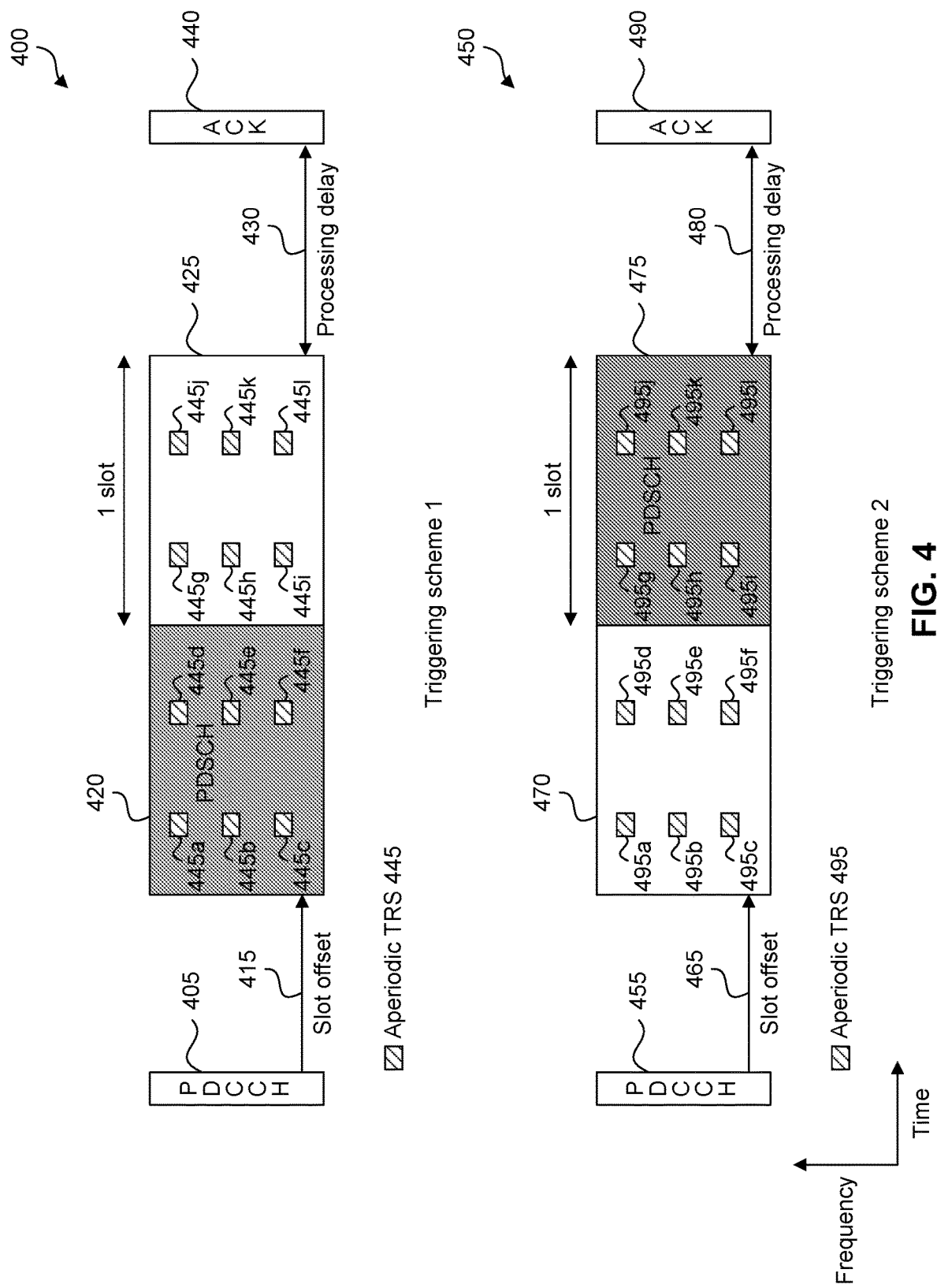
FIG. 4 illustrates aperiodic Tracking Reference Signals (TRSs), according to some embodiments of the disclosure.

FIG. 4 illustrates aperiodic TRSs, according to some embodiments of the disclosure. As a convenience and not a limitation, FIG. 4, may be described with elements of earlier figures. In some embodiments, the downlink assignment transmitted by a gNB can be based on a 1 slot format, a 2 slot format as shown in FIG. 4, or both as needed. Illustration 400 depicts triggering scheme 1 that includes PDCCH 405 that indicates slot offset 415 between the PDCCH 405 and the slot that contains the first aperiodic TRS, 445a. In triggering scheme 1, slot offset 415 is also the same for PDSCH 420 that is triggered by PDCCH 405. PDSCH 420 includes aperiodic TRS 445a-445f, second slot 425 includes one or more aperiodic TRSs 445g-445l, and processing delay 430 represents the delay before a UE transmits an ACK 440 (e.g., HARQ/ACK). TRS 445a-445f and TRS 445g-1 are carried by predetermined corresponding resource elements as shown in FIG. 4, where the corresponding resource elements can be indicated in the PDCCH.

In operation, TRP 140 of FIG. 1B can determine based on an uplink reference signal (e.g., SRS, uplink DMRS) that the Doppler offset is changing quickly and the UE is likely traveling at high speed. In response to the determination, TRP 140 transmits PDCCH 405. UE 135 of FIG. 1 receives PDCCH 405 and determines at least: that there are two consecutive time slots that include aperiodic TRSs 445a-445l, and slot offset 415 that indicates where the slot that includes first aperiodic TRS 445a. As an example, UE 135 accesses PDSCH 420 and buffers the data from PDSCH 420 that can include combined signals from TRP 140 and TRP 150. In some embodiments, there may be more than two TRPs (e.g., more than two gNBs.) Once UE 135 determines a Doppler offset based on one or more of aperiodic TRS 445a-445f, UE 135 uses the Doppler offset to decode the buffered data. For example, UE 135 can use one or more aperiodic TRS 445a-445f of PDSCH 420 to determine a Doppler offset. In some embodiments UE 135 (e.g., processor 310 of system 300, UE 135) measures an average Doppler measurement based on one or more of aperiodic TRS 445a-445f. UE 135 processes the information and uses the last symbol of the last aperiodic TRS, 445l, as the basis for processing the acknowledgments. In some embodiments, UE 135 uses one or more of aperiodic TRSs 445g-445l to calculate an average Doppler offset measurement.

In some embodiments UE 135 uses one or more aperiodic TRS 445a-445f without periodic TRSs to measure a Doppler offset. In some embodiments, UE 135 uses one or more aperiodic TRS 445 with periodic TRSs (not shown) to measure a Doppler offset (e.g., include Doppler offset measurements based on a periodic TRS to determine an average Doppler offset.)

Illustration 450 depicts triggering scheme 2 that includes PDCCH 455 that indicates slot offset 465 between the PDCCH 455 and the slot that contains the first aperiodic TRS, 495a-f. In triggering scheme 2, slot offset 465 is different than the slot offset for PDSCH 475, and thus, PDSCH 475 is in the second consecutive slot. PDSCH 475 is also triggered by PDCCH 455. First slot 470 includes aperiodic TRSs 495a-495f, PDSCH 475 includes one or more aperiodic TRSs 495g-495l, and processing delay 480 represents the delay before ACK 490 (e.g., HARQ/ACK) is transmitted. For example, TRP 140 of FIG. 1B can transmit PDCCH 455. UE 135 of FIG. 1 receives PDCCH 455 and determines at least: that there are two consecutive slots that include aperiodic TRSs 495a-495l, and slot offset 465 that indicates where the slot that includes first aperiodic TRS 495a. As an example, UE 135 accesses PDSCH 475 and buffers the data from PDSCH 475 that can include combined signals from TRP 140 and TRP 150.

Once UE 135 determines a Doppler offset based on one or more of aperiodic TRSs 495g-495l, UE 135 uses the Doppler offset to decode the buffered data. For example, UE 135 can use an aperiodic TRS 495 of PDSCH 475 to determine a Doppler offset. In some embodiments UE 135 (e.g., processor 310 of system 300, UE 135) measures an average Doppler measurement based on one or more of aperiodic TRS 495g-445l. UE 135 processes the information and uses the last symbol of PDSCH 475, as the basis for processing the acknowledgments. In some embodiments, UE 135 uses one or more of aperiodic TRSs 495a-495f to calculate an average Doppler offset measurement.

In some embodiments UE 135 uses one or more aperiodic TRS 495 without periodic TRSs (not shown) to measure a Doppler offset. In some embodiments, UE 135 uses one or more aperiodic TRS 495g-495l with periodic TRSs to measure a Doppler offset (e.g., include Doppler offset measurements based on a periodic TRS to determine an average Doppler offset.)

Figure 5:
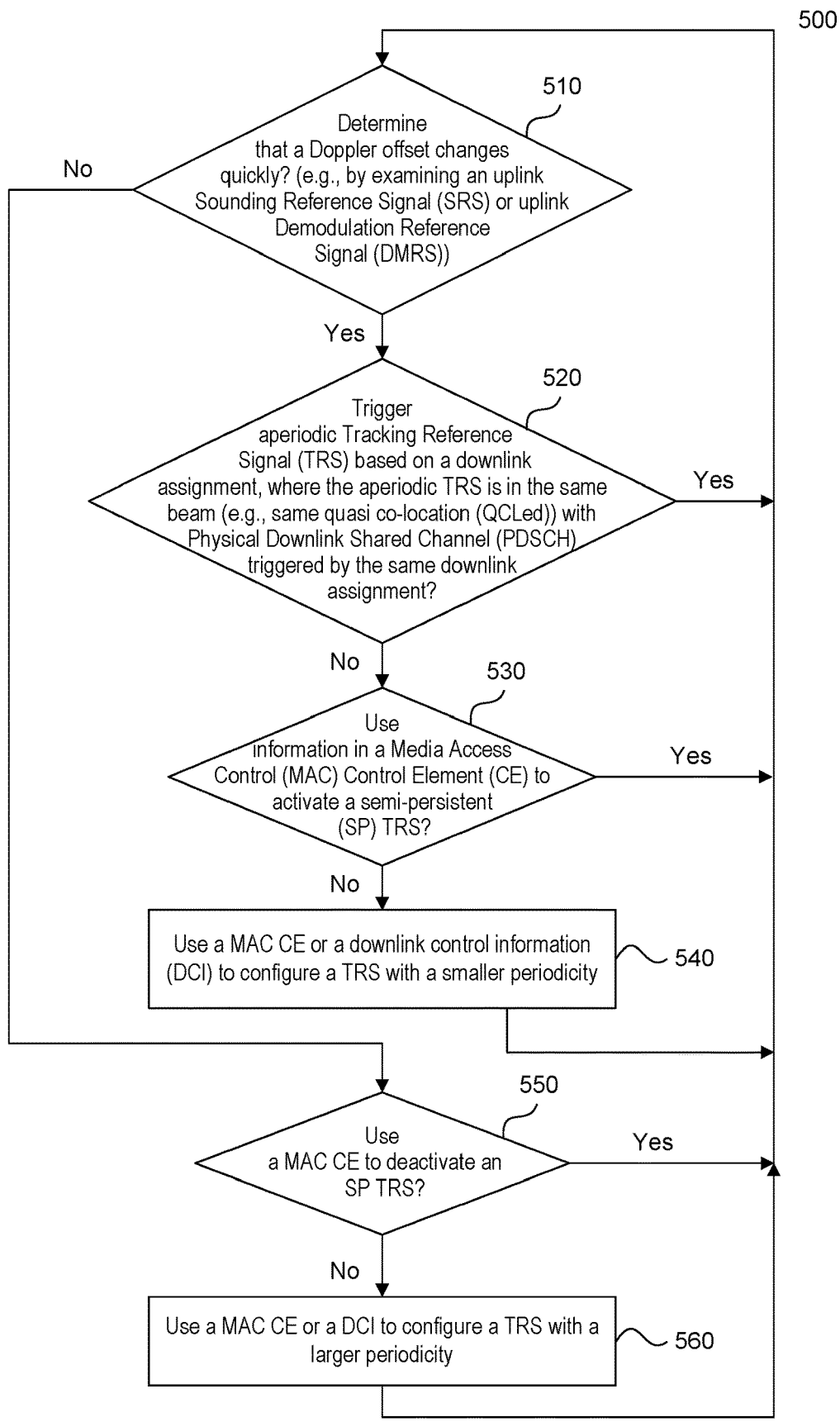
FIG. 5 illustrates a method for an example wireless system for transmitting enhanced TRS in a SFN with combined signals, according to some embodiments of the disclosure.

FIG. 5 illustrates a method 500 for an example wireless system for transmitting enhanced TRS in a SFN with combined signals, according to some embodiments of the disclosure. As a convenience and not a limitation, FIG. 5 may be described with elements from earlier figures. For example, method 500 may be performed by system 300 of FIG. 3, a gNB, TRP 140 or TRP 150 of FIG. 1B.

At 510, system 300 determines whether a Doppler offset measurement changed quickly. For example, system 300 can examine an uplink Sounding Reference Signal (SRS) or an uplink Demodulation Reference Signal (DMRS) to make the determination. When the Doppler offset measurement is determined to be changing quickly (e.g., one or more threshold are satisfied), method 500 proceeds to 520. Otherwise, method 500 proceeds to 550.

At 520, system 300 determines whether to trigger aperiodic TRS based on a downlink assignment (e.g., PDCCH), where the aperiodic TRS is in the same beam (e.g., same quasi co-location (QCLed)) with Physical Downlink Shared Channel (PDSCH) triggered by the same downlink assignment. When an aperiodic TRS is to be triggered based on a downlink assignment, (see FIG. 4) method 500 proceeds accordingly to generate aperiodic TRS as shown in FIG. 4, after which method 500 returns to 510. Otherwise, method 500 proceeds to 530.

At 530, system 300 determines whether to use information in a Media Access Control (MAC) Control Element (CE) to activate a semi-persistent (SP)-TRS. If SP-TRS are to be activated, system 300 uses MAC CE at layer 2 to activate and deactivate a SP-TRS in a 1 slot format, a 2 slot format, or both as needed. The minimal periodicity of a SP-TRS is less than or equal to that of a periodic TRS. By using MAC CE at layer 2 to activate (and later deactivate) SP-TRS, system 300 is able to provide higher Doppler measurement densities (e.g., allows the UE to make more frequent Doppler offset measurements and hence determine a more accurate Doppler offset measurement to use to decode PDSCH data where the PDSCH data includes a combined signal. If SP-TRS are activated, method 500 returns to 510 after the SP-TRS is generated. If SP-TRS are not activated, then method 500 proceeds to 540.

At 540, system 300 uses information in a MAC CE or a downlink control information (DCI) to configure a periodic TRS with a smaller periodicity. Using MAC CE or DCI avoids radio resource control (RRC) reconfiguration which takes much longer to achieve. In some embodiments, system 300 configures a periodic TRS with a large periodicity when a UE is not moving quickly (see 560 below) and configures a periodic TRS with a small periodicity when the UE is moving quickly (e.g., when the Doppler offset of the combined signal changes quickly.) By adjusting the periodicity of the periodic TRS via MAC CE or DCI, system 300 can achieve network and UE power savings compared to using RRC reconfigurations. System 300 uses MAC CE or DCI to configure a periodic TRS with a smaller periodicity, and method 500 returns to 510 after the periodic TRS is generated.

Returning to 510, when system 300 determines that the Doppler offset is not changing quickly, method 500 proceeds to 550.

At 550, if SP-TRS were activated at 530, system 300 deactivates the SP-TRS using MAC CE, and method 500 returns to 510. Otherwise, method 500 proceeds to 560.

At 560, system 300 uses MAC CE or DCI to configure a periodic TRS with a larger periodicity and method 500 returns to 510.

Figure 6:
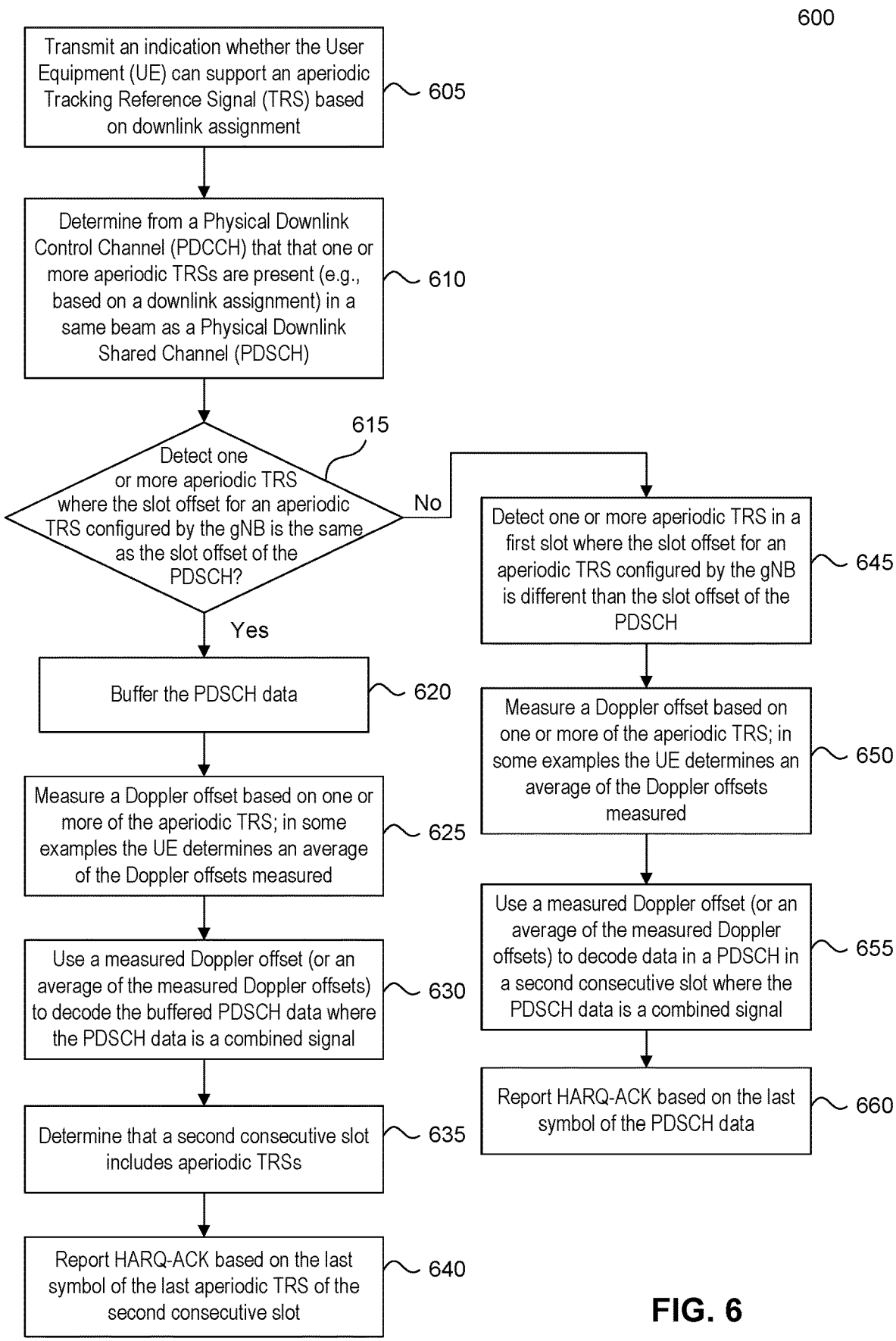
FIG. 6 illustrates a method for an example wireless system for receiving enhanced TRS in a SFN with combined signals, according to some embodiments of the disclosure.

FIG. 6 illustrates a method 600 for an example wireless system for receiving enhanced TRS in a SFN with combined signals, according to some embodiments of the disclosure. As a convenience and not a limitation, FIG. 6 may be described with elements from earlier figures. For example, method 600 may be performed by system 300 of FIG. 3, or UE 135 of FIG. 1B.

At 605, system 300 transmits an indication of whether a UE (e.g., UE 135) can support an aperiodic TRS based on downlink assignment. Accordingly, gNBs that receive the indication can proceed to transmit aperiodic TRSs using downlink assignment (e.g., PDCCH) to assist UE 135 in determining a more accurate Doppler offset for a combined signal in a SFN.

At 610, system 300 determines from a Physical Downlink Control Channel (PDCCH) that that one or more aperiodic TRSs are present (e.g., based on a downlink assignment) in a same beam as a Physical Downlink Shared Channel (PDSCH).

At 615, system 300 detects whether the slot offset configured by the gNB for a slot that includes the first aperiodic TRS (e.g., 445a) is the same as the slot offset of the PDSCH. If the slot offsets are the same (e.g., illustration 400, triggering scheme 1, of FIG. 4), method 600 proceeds to 620. Otherwise, method 600 proceeds to 645.

At 620, system 300 accesses PDSCH, and buffers the PDSCH data.

At 625, system 300 measures a Doppler offset based on one or more of the aperiodic TRSs (e.g., aperiodic TRSs 445a-445f of FIG. 4); in some examples the UE determines an average of the Doppler offsets measured of one or more of the aperiodic TRSs 445a-445f of FIG. 4.

At 630, system 300 uses a measured Doppler offset (or an average of the measured Doppler offsets) determined at 625 to decode the buffered PDSCH data where the PDSCH data is a combined signal (e.g., a combined signal of at least TRP 140 and TRP 150.)

At 635, system 300 determines that a second consecutive slot includes aperiodic TRSs. In some embodiments, system 300 uses the aperiodic TRSs 445g-445l to determine a measured Doppler offset such as averaging the measured Doppler offsets based on one or more aperiodic TRSs 445g-445l with the measured Doppler offset at 625.

At 640, system 300 reports acknowledgements (e.g., HARQ-ACK) based on the last symbol of the last aperiodic TRS of the second consecutive slot (e.g., aperiodic TRS 445l.)

Returning to 645, system 300 has determined that the slot offset configured by the gNB for a slot that includes the first aperiodic TRS (e.g., 495a) is the not the same as the slot offset of the PDSCH (e.g., illustration 450, triggering scheme 2, of FIG. 4.)

At 650, system 300 measures a Doppler offset based on one or more of the aperiodic TRS (e.g., aperiodic TRSs 495a-495f of FIG. 4); in some examples system 300 (e.g., UE 135) determines an average of the Doppler offsets measured.

At 655, system 300 uses the measured Doppler offset (or an average of the measured Doppler offsets) at 650 to decode data in a PDSCH (e.g., PDSCH 475) in a second consecutive slot, where the PDSCH data includes signals from two or more TRPs (e.g., gNBs, TRP 140, TRP 150). In some embodiments, system 300 measures a second Doppler offset based on one or more of the aperiodic TRS (e.g., aperiodic TRSs 495g-495l of FIG. 4); in some examples system 300 (e.g., UE 135) buffers the PDSCH data determines an average of the Doppler offsets measured of one or more of the aperiodic TRSs 495g-495l of FIG. 4. System 300 can use the second Doppler offset (or second average Doppler offset) to decode the data in PDSCH 475. In some embodiments, system 300 uses a combination of measured Doppler offsets (e.g., at 650) and the second Doppler offset to decode the buffered PDSCH data that includes a combined signal.

At 660, system 300 reports acknowledgements (e.g., HARQ-ACK) based on the last symbol of the PDSCH data (e.g., a last symbol of PDSCH 475.)

Figure 7:
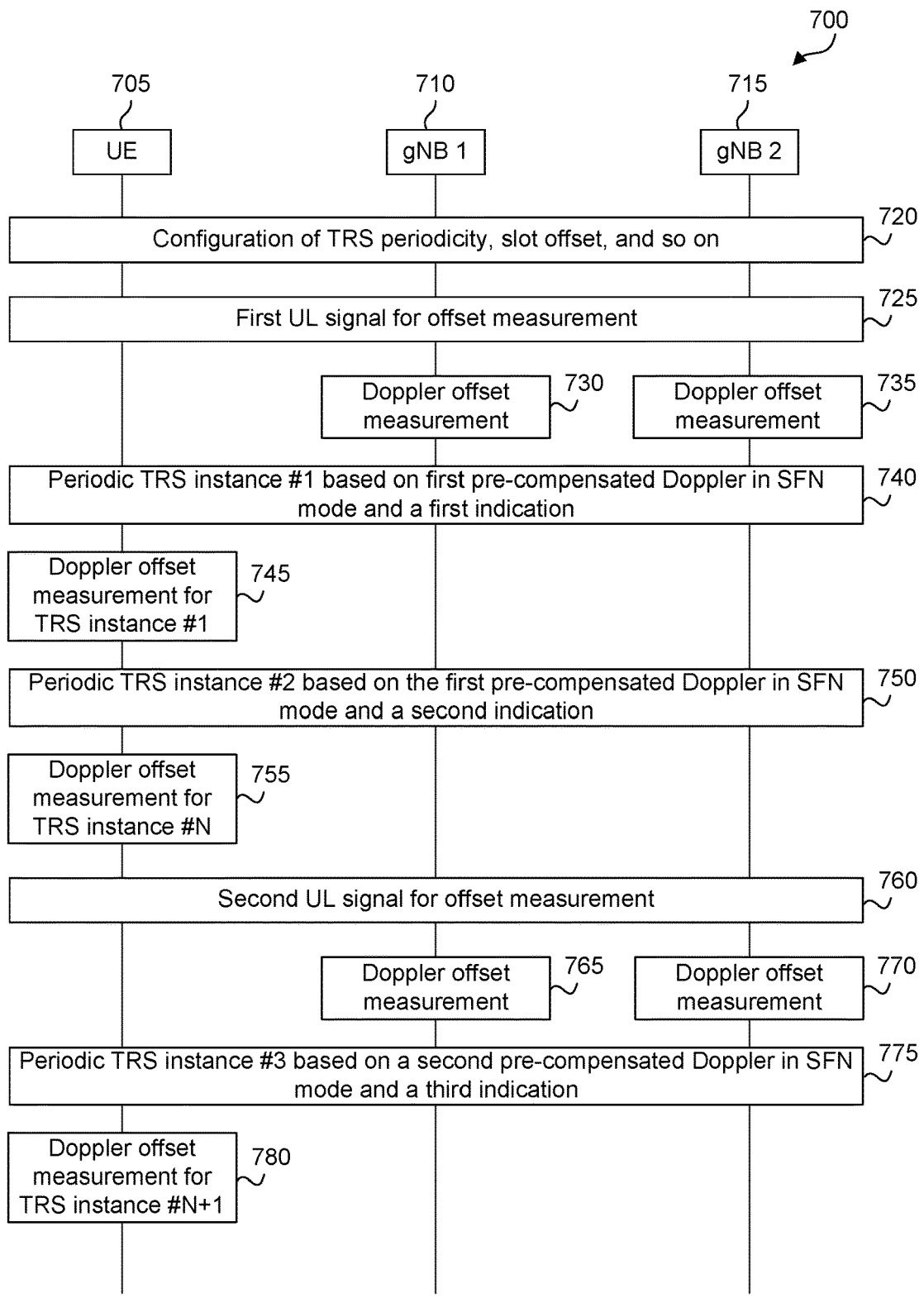
FIG. 7 illustrates electronic devices that implement periodic TRS based on Pre-compensated Doppler offset, according to some embodiments of the disclosure.

FIG. 7 illustrates an example 700 of electronic devices that implement periodic TRS based on Pre-compensated Doppler offset, according to some embodiments of the disclosure. As a convenience and not a limitation, FIG. 7 may be described with elements from earlier figures. Example 700 includes UE 705, gNB1 710, and gNB2 715. Each of these electronic devices can be system 300 of FIG. 3. UE 705 can be UE 135 of FIG. 1B, while each of gNB1 710 and gNB2 715 can be TRP 140 or TRP 150 of FIG. 1B.

At 720, the periodicity of periodic TRSs, slot offsets, and other parameters can be configured.

At 725, UE 705 transmits a first UL signal; gNB1 710 and gNB2 715 receive the first uplink signal (e.g., SRS or uplink DMRS) associated with UE 705.

At 730 and 735, gNB1 710 and gNB2 715, respectively, measure a Doppler offset based on the first uplink signal received from 725 (e.g., the first received SRS or uplink DMRS.)

At 740, gNB1 710 and gNB2 715 use the corresponding Doppler offset determined at 730 and 735 to adjust the periodic TRS and transmit periodic TRS instance #1 with a first indication accordingly. For example, the adjustment may include using the determined Doppler offset from 730 and 735 to apply a phase shift to create and transmit periodic TRS instance #1. Thus, the periodic TRS instance #1 can be a periodic TRS based on a Pre-compensated Doppler in a SFN. In some embodiments, the first indication enables a gNB and a UE maintain a same understanding of whether a periodic TRS is based on a given uplink signal (e.g., first UL signal at 725) or a different uplink signal (e.g., a subsequent uplink signal 760 that gNB1 710 and/or gNB2 715 subsequently receives.)

At 745, UE 705 uses the periodic TRS instance #1 to determine a Doppler offset measurement. In addition, UE 705 uses the first indication to determine if the Doppler offset measurement can be combined (e.g., averaged with) with previous Doppler offset measurements.

At 750, gNB1 710 and gNB2 715 transmit periodic TRS instance #2 based on the same pre-compensated Doppler (e.g., based on the same Doppler offset determined at 730 and 735 respectively) and a second indication.

At 755, UE 705 uses periodic TRS instance #2 that is based on the same pre-compensated Doppler in SFN mode to determine a Doppler offset measurement for periodic TRS instance #2. UE 705 uses the second indication to determine that periodic TRS instance #2 is based on the same precompensated Doppler in SFN mode as at 740, and UE 705 may include the Doppler offset measurement for periodic instance #2 in averaging calculations to determine a more accurate Doppler offset in a SFN when data is based on a combined signal. Otherwise, UE 705 would not include periodic TRS instance #2 in the averaging calculations as discussed further below.

At 760, UE 705 transmits a second UL signal; gNB1 710 and gNB2 715 receive the second uplink signal (e.g., SRS or uplink DMRS) associated with UE 705.

At 765 and 770, gNB1 710 and/or gNB2 715, respectively, measure a Doppler offset based on the second uplink signal received (e.g., the second received SRS or uplink DMRS.)

At 775, gNB1 710 and gNB2 715 use the corresponding Doppler offset determined at 765 and 770 to adjust the periodic TRS and transmit periodic TRS instance #3 accordingly. For example, the adjustment may include using the determined Doppler offset from 765 and 770 to apply a different phase shift to create and transmit periodic TRS instance #3. Thus, the periodic TRS instance #3 can be a periodic TRS based on a different Pre-compensated Doppler in a SFN. In some embodiments, gNB1 710 and gNB2 715 also transmit a third indication to maintain a same understanding with UE 705 of whether a periodic TRS is based on a given uplink signal or a different uplink signal (e.g., a subsequent uplink signal that gNB1 710 and/or gNB2 715 subsequently receives.)

At 780, UE 705 uses periodic TRS instance #3 that is based on the different pre-compensated Doppler in SFN mode to determine a third Doppler offset measurement for periodic TRS instance #2. UE 705 uses the third indicator to determine that the periodic TRS instance #3 is based on a different Pre-compensated Doppler in SFN mode as at 775, and UE 705 may not include the Doppler offset measurement for periodic instance #3 in averaging calculations to determine a more accurate Doppler offset in a SFN when data is based on a combined signal.

Figure 8:
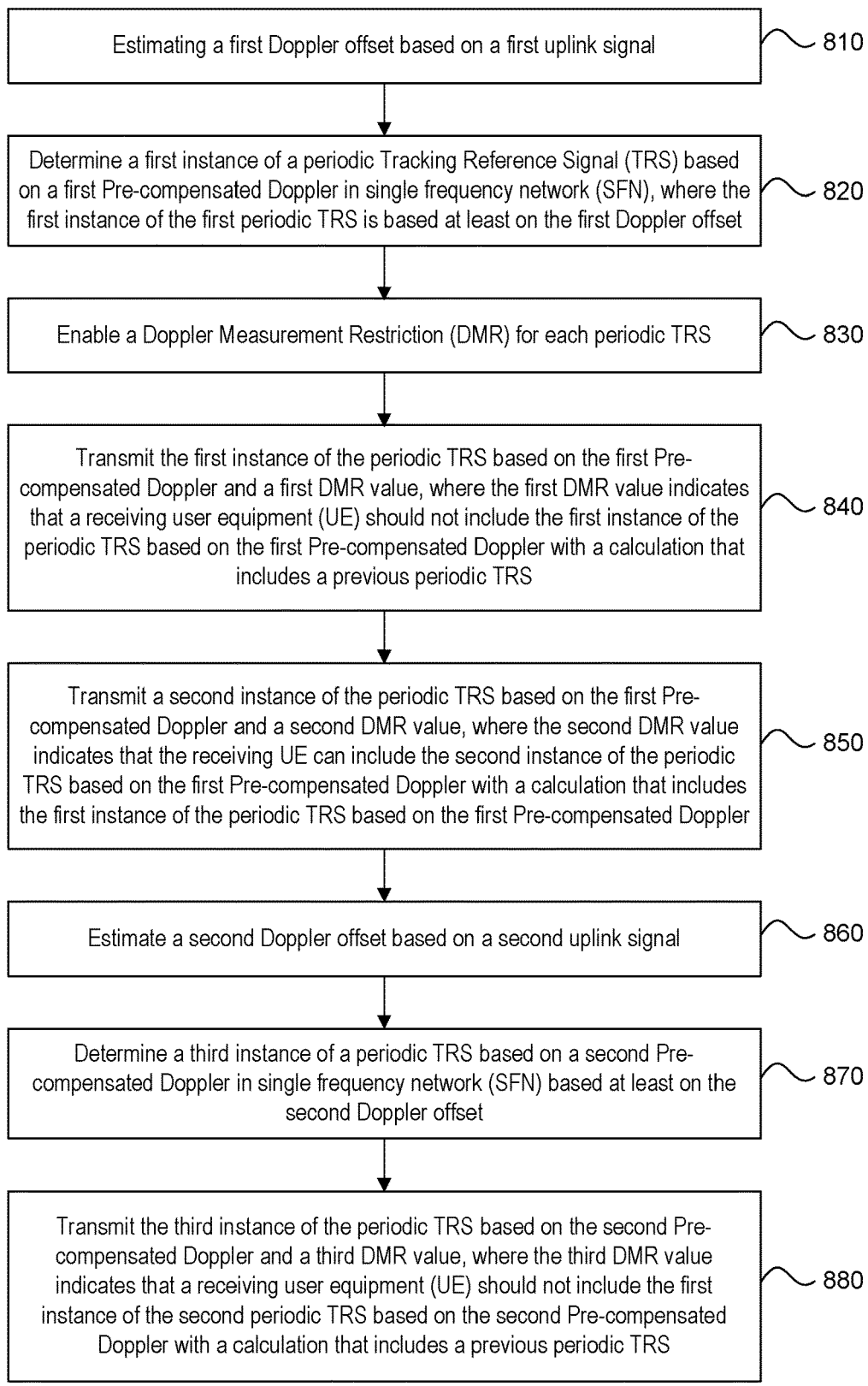
FIG. 8 illustrates a method for an example wireless system for transmitting a periodic TRS based on Pre-compensated Doppler offset, according to some embodiments of the disclosure.

FIG. 8 illustrates a method 800 for an example wireless system for transmitting a periodic TRS based on Pre-compensated Doppler offset, according to some embodiments of the disclosure. As a convenience and not a limitation, FIG. 8 may be described with elements from earlier figures. Method 800 can be performed by system 300 of FIG. 3, a gNB, TRP 140 and/or TRP 150 of FIG. 1B. For example, a gNB can employ a Doppler Measurement Restriction (DMR) as an indicator that is transmitted with each periodic TRS where the DMR indicates whether the periodic TRS is based on a same or different UL signal for offset measurement. The value of the DMR enables a UE to determine whether a Doppler offset measurement based on the periodic TRS can be averaged (or not) with previous Doppler offset measurement. The DMR can be configured by a RRC layer signaling for each periodic TRS or periodic TRS resource set.

At 810, system 300 estimates a first Doppler offset based on a first uplink signal (e.g., 725, 730, and 735 of FIG. 7.)

At 820, system 300 determines a first instance of a periodic TRS based on a first Pre-compensated Doppler in single frequency network (SFN), where the first instance of the first periodic TRS is based at least on the first Doppler offset.

At 830, system 300 enables a DMR for each periodic TRS.

At 840, system 300 transmits the periodic TRS instance #1 based on the first Pre-compensated Doppler and a first DMR value (e.g., 740 of FIG. 7), and the first DMR value that indicates that a receiving user equipment (UE) should not include the first instance of the periodic TRS based on the first Pre-compensated Doppler with a calculation that includes a previous periodic TRS. For example, the first DMR value may be enabled. This indicates to a UE 705 of FIG. 7, that UE 705 should not include the Doppler offset measurement for periodic TRS instance #1 (at 745 of FIG. 7) with previous Doppler offset measurements because TRS instance #1 based on pre-compensated Doppler in SFN mode is based on a new UL signal at 725 of FIG. 7.

At 850, system 300 transmits the periodic TRS instance #2 based on the first Pre-compensated Doppler and a second DMR value (e.g., 750 of FIG. 7), where the second DMR value (e.g., not enabled) indicates that the receiving UE can include (e.g., at 755 of FIG. 7) Doppler offset measurements of the periodic TRS instance #2 based on the first Pre-compensated Doppler with a calculation that includes the periodic TRS instance #1 based on the first Pre-compensated Doppler. This is because both periodic TRS instances #1 and #2 are based on the same UL signal at 725 of FIG. 7.

At 860, system 300 estimates a second Doppler offset based on a second uplink signal (e.g., 760, 765, 770 of FIG. 7.)

At 870, system 300 determines a periodic TRS instance #3 based on a second Pre-compensated Doppler in SFN based at least on the second Doppler offset.

At 880, system 300 transmits the periodic TRS instance #3 based on the second Pre-compensated Doppler and a third DMR value (e.g., 775 of FIG. 7), where the third DMR value indicates that a receiving UE should not include the periodic TRS instance #3 based on the second Pre-compensated Doppler with a calculation that includes a previous periodic TRS. For example, the third DMR value may be enabled. This indicates to UE 705 of FIG. 7, that UE 705 should not include the Doppler offset measurement for periodic TRS instance #3 (at 780 of FIG. 7) with previous Doppler offset measurements because TRS instance #3 is based on a second Pre-compensated Doppler in SFN mode is based on a second UL signal at 760 of FIG. 7, which is different than the first UL signal at 725.

Figure 9:
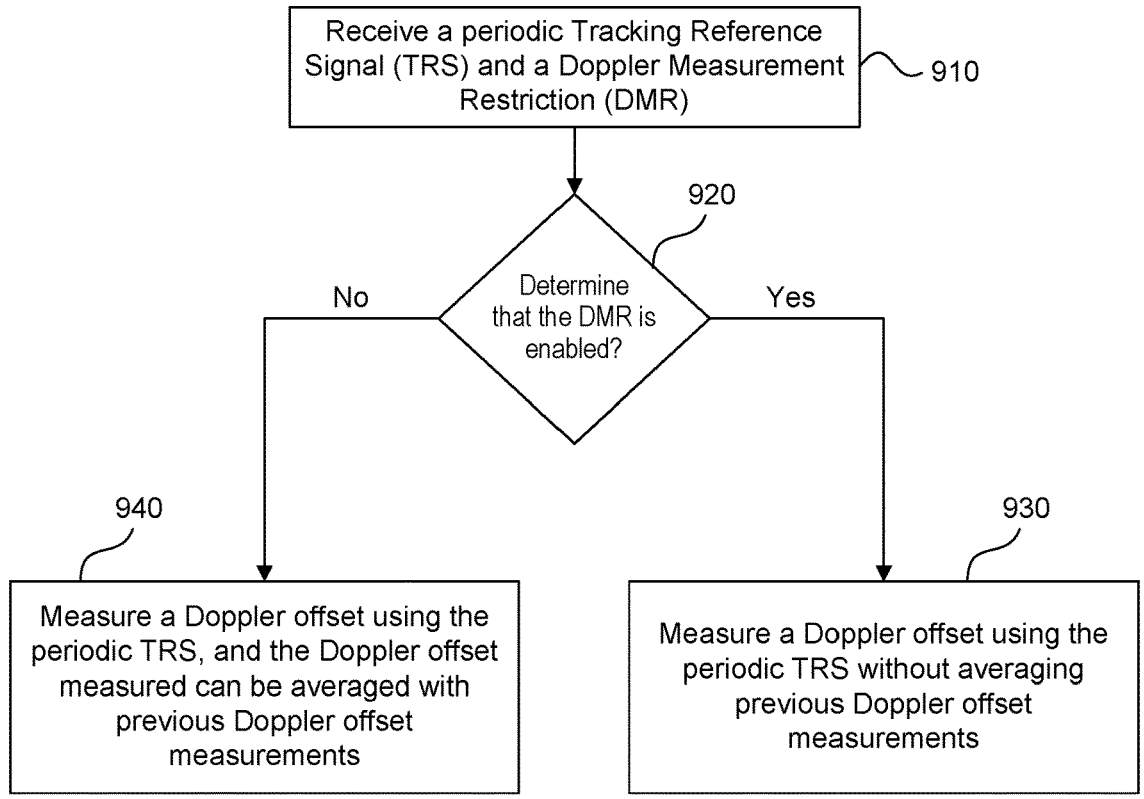
FIG. 9 illustrates a method for an example wireless system for receiving a periodic TRS based on Pre-compensated Doppler, according to some embodiments of the disclosure.

FIG. 9 illustrates a method 900 for an example wireless system for receiving a periodic TRS based on Pre-compensated Doppler, according to some embodiments of the disclosure. As a convenience and not a limitation, FIG. 9 may be described with elements from earlier figures. Method 900 can be performed by system 300 of FIG. 3, a UE such as UE 135 of FIG. 1B or UE 705 of FIG. 7.

At 910, system 300 receives a periodic TRS and a Doppler Measurement Restriction (DMR) (e.g., 740, 750, or 775 of FIG. 7.) The DMR can be configured by higher layer signaling, (e.g., RRC signaling.)

At 920, system 300 determines whether the DMR is enabled. When the DMR is enabled, method 900 proceeds to 930. Otherwise, method 900 proceeds to 940.

At 930, system 300 determines that the DMR is enabled and system 300 measures a Doppler offset using the periodic TRS without averaging previous Doppler offset measurements together with the Doppler offset. For example, the periodic TRS could be periodic TRS instance #1 or #3 of FIG. 7.

At 940, system 300 determines that the DMR is not enabled, and measures a Doppler offset using the periodic TRS; the Doppler offset measured can be averaged with previous Doppler offset measurements. For example, the periodic TRS could be periodic TRS instance #2.

In some embodiments, a gNB can indicate a usage for particular uplink signals such as particular SRSs and mark them for Doppler estimation purposes. The marking can be completed by RRC signaling at layer 3 or using MAC CE at layer 2 to use a DMR, but to indicate different things. Instead of including a DMR with each periodic TRS as described earlier, a DMR is sent to mark particular uplink signals such as particular SRSs and mark them for Doppler estimation purposes. Using FIG. 7 as an example, first uplink signal for offset measurement at 725 and second uplink signal for offset measurement at 760 can each be marked as a Doppler estimation SRS with an indication (e.g., a DMR.) For periodic TRS instances in between two marked Doppler estimation SRS instances, a UE (e.g., UE 705) can perform averaging to estimate a Doppler offset (e.g., at 755, because both 745 and 755 are between marked Doppler estimation SRS 725 and 760 of FIG. 7. In contrast, for periodic TRS instances across two marked Doppler estimation SRS instances 725 and 760, UE 705 cannot perform averaging. For example, UE 705 cannot perform Doppler offset measurement averaging with Doppler offset measurements at 755 and Doppler offset measurements 780 as they are across (e.g., cross over) marked Doppler estimation SRS instance 760. In some embodiments a DMR is only included for particular uplink signals (e.g., SRS and DMRS). In some embodiments, a DMR is included for each particular uplink signal where the value of the DMR indicates whether the uplink signal is particularly marked for Doppler estimation.

In some embodiments, when a periodic TRS is a source association for a marked Doppler estimation SRS, a UE applies the same Doppler offset measurement (e.g., frequency offset) that the UE measured based on the periodic TRS received (e.g., a periodic TRS that is not based on a pre-compensated Doppler in SFN) to transmit the marked Doppler estimation SRS on the uplink. In some embodiments, when the marked Doppler estimation SRS is a source association for the periodic TRS, a UE interprets the periodic TRS transmission as based on a Doppler offset Pre-compensation by the gNB.

In some embodiments, a gNB can configure using RRC signaling at layer 3, a filtering window size for averaging Doppler measurement results for periodic TRSs. In an example, a starting point for the filtering window size can be predefined (e.g., the first instance of a periodic TRS, or configured by higher layer signaling such as RRC signaling.) For periodic TRSs within the filtering windows, a UE measures Doppler offsets based on averaging periodic TRS instances. For TRSs across the filtering window, a UE measures the Doppler offset based on each periodic TRS instance independently (e.g., no averaging with previous Doppler offset measurements.)

Figure 10:
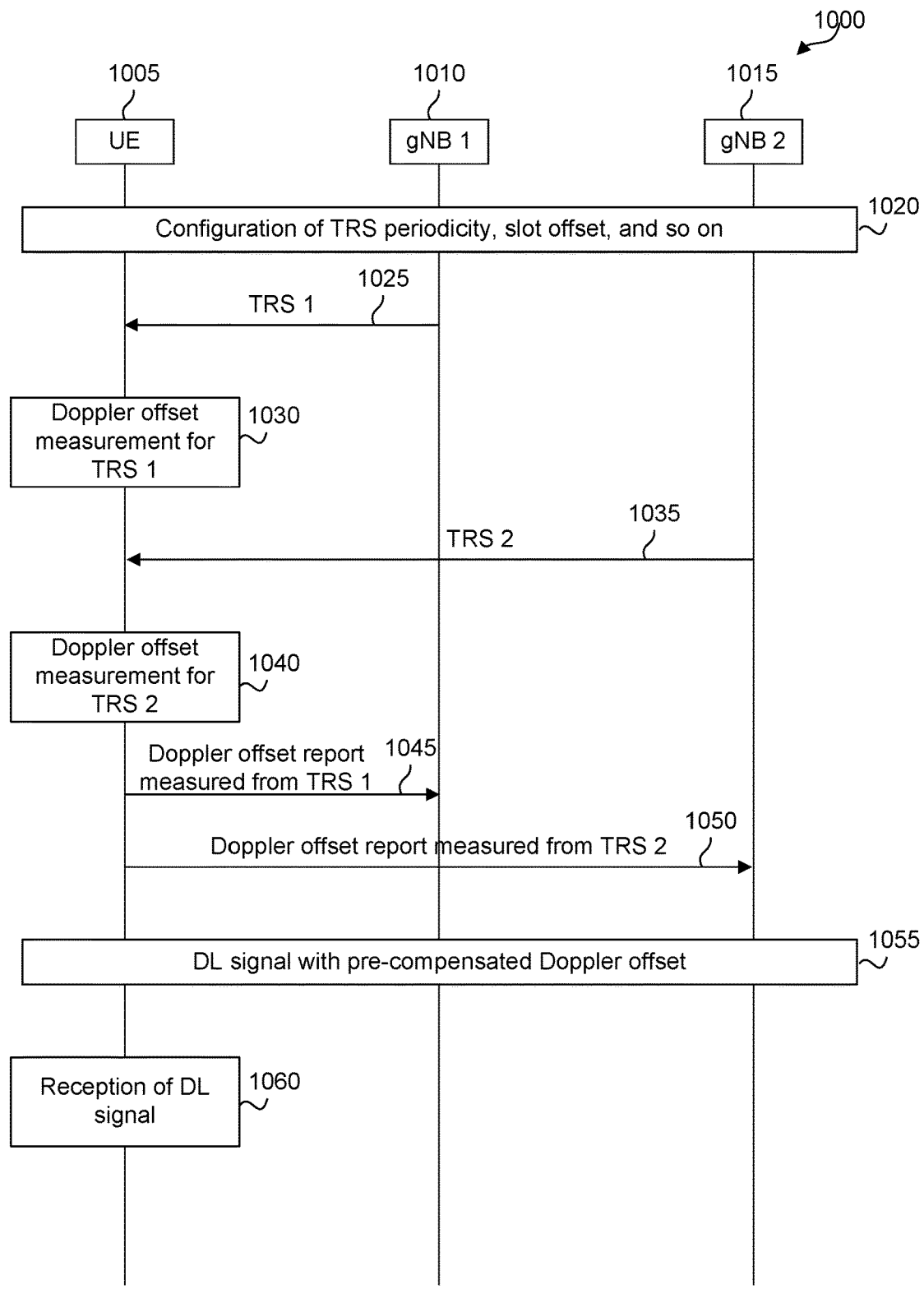
FIG. 10 illustrates electronic devices that implement periodic TRS based on Pre-compensated Doppler offset among using non-SFN measurements, according to some embodiments of the disclosure.

FIG. 10 illustrates an example 1000, with electronic devices that implement periodic TRS based on Pre-compensated Doppler offset among using non-SFN measurements, according to some embodiments of the disclosure. As a convenience and not a limitation, FIG. 10 may be described with elements from earlier figures. Example 1000 includes UE 1005 that can be UE 705, gNB1 1010 and gNB2 1015 that can be gNB1 710, or gNB2 715. Each of these electronic devices can be system 300 of FIG. 3. UE 705 can be UE 135 of FIG. 1B, while each of gNB1 710 and gNB2 715 can be TRP 140 or TRP 150 of FIG. 1B. In an example, a UE can measure Doppler offset measurements from periodic TRS instances from gNBs separately (e.g., in a non-SFN manner) and report the Doppler offset reports back to individual gNBs. Each of the gNBs can determine a Pre-compensated Doppler and transmit a downlink signal in a SFN manner.

At 1020, the periodicity of periodic TRSs, slot offsets, and other parameters can be configured. For example, a gNB can configure a report quantity as a Doppler-Shift for each report when a channel measurement resource is based on a periodic TRS.

At 1025, gNB1 1010 transmits periodic TRS1 to UE 1005.

At 1030, UE 1005 determines the Doppler offset measurement for periodic TRS1.

At 1035, gNB2 1015 transmits periodic TRS2 to UE 1005.

At 1040, UE 1005 determines a Doppler offset measurement for periodic TRS2.

At 1045, UE 1005 transmits a Doppler offset report measured from periodic TRS1 to gNB1 1010. In some embodiments, a report is determined for each periodic TRS independently; in some embodiments, the UE can report the Doppler offset measured for multiple periodic TRS resource sets. Further, a UE can report a differential Doppler offset measurement between two TRPs. In some embodiments, UE 1005 reports the measured Doppler offset via Physical Uplink Control Channel (PUCCH), Physical Uplink Shared Channel (PUSCH), or via a MAC CE. A determination of whether UE 1005 reports the Doppler offset measurement for each periodic TRS can be configured by higher layer signaling (e.g., RRC signaling) or via DCI.

At 1050, UE 1005 transmits a Doppler offset report measured from TRS2 to gNB2 1015. In some embodiments, a report is determined for each periodic TRS independently; in some embodiments, the UE can report the Doppler offset measured for multiple periodic TRS resource sets. Further, a UE can report a differential Doppler offset measurement between two TRPs. In some embodiments, UE 1005 reports the measured Doppler offset via PUCCH, PUSCH, or via a MAC CE. A determination of whether UE 1005 reports the Doppler offset measurement for each periodic TRS can be configured by higher layer signaling (e.g., RRC signaling) or via DCI.

At 1055, gNB1 1010 determines a Pre-compensate Doppler offset based on the report received at 1045, and transmits a DL signal with the Pre-compensated Doppler offset (e.g., within a PDSCH.) Similarly, gNB2 1015 determines a Pre-compensate Doppler offset based on the report received at 1050, and transmits a DL signal with the Pre-compensated Doppler offset (e.g., within a PDSCH.) Note that the downlink signal at 1055 can be a combined signal in SFN mode.

At 1060, UE 1005 receives the downlink combined signal from gNB1 1010 and gNB2 1015.

Figure 11:
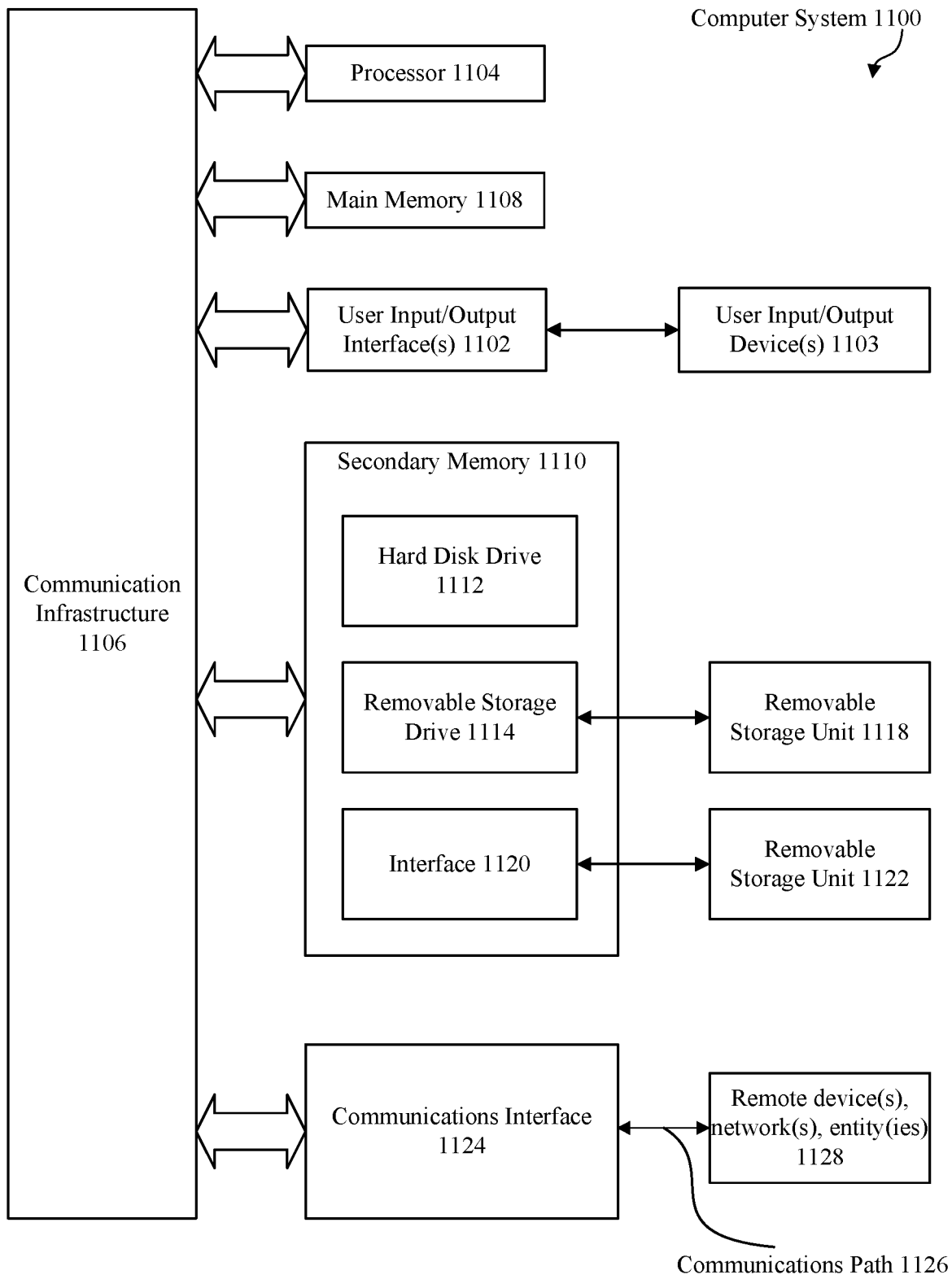
FIG. 11 is an example computer system for implementing some embodiments or portion(s) thereof.

Various embodiments can be implemented, for example, using one or more computer systems, such as computer system 1100 shown in FIG. 11. Computer system 1100 can be any well-known computer capable of performing the functions described herein. For example, and without limitation, gNBs, TRPs, and user equipment including but not limited to electronic devices such as smart phones, personal digital assistants (PDAs), cell phones, laptops, desktops, as described with regard to FIG. 1B and/or other apparatuses and/or components. The gNBs, TRPs, and/or UE may include the functions as shown in system 300 of FIG. 3 and/or some or all of method 500 of FIG. 5, method 600, of FIG. 6, processes of FIG. 7, method 800 of FIG. 8, method of FIG. 9, and processes of FIG. 10. For example, computer system 1100 can be used in wireless devices to support enhanced TRS in support of high speed use cases of 5G wireless communications in a SFN.

Computer system 1100 includes one or more processors (also called central processing units, or CPUs), such as a processor 1104. Processor 1104 is connected to a communication infrastructure or bus 1106. Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some embodiments, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A first electronic device, comprising:
   a transceiver configured to transmit and receive wireless communications; and
   a processor, coupled to the transceiver, configured to:
      receive using the transceiver, an uplink reference signal from a user equipment (UE);

determine based at least on the uplink reference signal, that a Doppler offset has satisfied a threshold;
based on the determination, use a downlink assignment to enable an aperiodic Tracking Reference Signal (TRS) with high measurement density, wherein the aperiodic TRS shares a same quasi-co-located (QCL) parameter with a Physical Downlink Shared Channel (PDSCH) signal triggered by the downlink assignment; and
transmit, using the transceiver, the aperiodic TRS over a single frequency network (SFN) to the UE using the downlink assignment, wherein the aperiodic TRS enables the UE to decode the PDSCH signal that comprises a combined signal from the first electronic device and a second electronic device in the SFN.

2. The first electronic device of claim 1, wherein the processor is further configured to:
determine a slot offset for a slot that includes the aperiodic TRS, wherein the slot offset is determined by that of the PDSCH signal.

3. The first electronic device of claim 1, wherein the processor is further configured to:
transmit, using the transceiver, a second consecutive slot that includes one or more aperiodic TRSs; and
receive a HARQ-ACK signal based on a last symbol of a last aperiodic TRS of the one or more aperiodic TRSs.

4. The first electronic device of claim 1, wherein the processor is further configured to:
determine a first slot offset for a first slot that includes the aperiodic TRS, wherein the first slot offset is different than a second slot offset of the PDSCH signal; and
transmit, using the transceiver, the aperiodic TRS in the first slot.

5. The first electronic device of claim 1, wherein the processor is further configured to:
transmit, using the transceiver, a second consecutive slot that includes one or more aperiodic TRSs; and
receive a HARQ-ACK signal based on a last symbol of the PDSCH signal.

6. The first electronic device of claim 1, wherein the processor is further configured to:
use a Media Access Control (MAC) Control Element (CE) to activate a semi-persistent (SP)-TRS, wherein a minimal periodicity of the SP-TRS is less than or equal to that of a periodic TRS;
determine based on a second uplink reference signal received from the UE, that a second Doppler offset has satisfied a second threshold; and
based on the determination that the second threshold is satisfied, use the MAC CE to deactivate the SP-TRS.

7. The first electronic device of claim 1, wherein the processor is further configured to:
use a Media Access Control (MAC) Control Element (CE) or a Downlink Control Information (DCI) to lower a periodicity of a periodic TRS;
determine based on a second uplink reference signal received from the UE, that a second Doppler offset has satisfied a second threshold; and
based on the determination that the second threshold is satisfied, use the MAC CE or DCI to raise the periodicity of the periodic TRS.

8. A method for a base station (BS), comprising:
receiving an uplink reference signal from a user equipment (UE);
determining based at least on the uplink reference signal, that a Doppler offset has satisfied a threshold;
based on the determination, using a downlink assignment to enable an aperiodic Tracking Reference Signal (TRS) with high measurement density, wherein the aperiodic TRS shares a same quasi-co-located (QCL) parameter with a Physical Downlink Shared Channel (PDSCH) signal triggered by the downlink assignment; and
transmitting, by the BS, in a single frequency network (SFN), the aperiodic TRS to the UE wherein the aperiodic TRS enables the UE to decode the PDSCH signal that comprises a combined signal from the BS and a second BS in the SFN.

9. The method of claim 8, further comprising:
determining a slot offset for a slot that includes the aperiodic TRS, wherein the slot offset is determined by that of the PDSCH signal.

10. The method of claim 8, further comprising:
transmitting a second consecutive slot that includes one or more aperiodic TRSs; and
receiving a HARQ-ACK signal based on a last symbol of a last aperiodic TRS of the one or more aperiodic TRSs.

11. The method of claim 8, further comprising:
determining a first slot offset for a first slot that includes the aperiodic TRS, wherein the first slot offset is different than a second slot offset of the PDSCH signal; and
transmitting the aperiodic TRS in the first slot.

12. The method of claim 8, further comprising:
transmitting a second consecutive slot that includes one or more aperiodic TRSs; and
receiving a HARQ-ACK signal based on a last symbol of the PDSCH.

13. A non-transitory computer-readable medium storing instructions that, when executed by a processor of a base station (BS), cause the BS to perform operations, the operations comprising:
receiving an uplink reference signal from a user equipment (UE);
determining based at least on the uplink reference signal, that a Doppler offset has satisfied a threshold;
based on the determination, using a downlink assignment to enable an aperiodic Tracking Reference Signal (TRS) with high measurement density, wherein the aperiodic TRS shares a same quasi-co-located (QCL) parameter with a Physical Downlink Shared Channel (PDSCH) signal by the downlink assignment; and
transmitting in a single frequency network (SFN), the aperiodic TRS to the UE, wherein the aperiodic TRS enables the UE to decode the PDSCH signal that comprises a combined signal from the BS and a second BS in the SFN.

14. The non-transitory computer-readable medium of claim 13, wherein operations further comprise:
transmitting a second consecutive slot that includes one or more aperiodic TRSs; and
receiving a HARQ-ACK signal based on a last symbol of a last aperiodic TRS of the one or more aperiodic TRSs.

15. The non-transitory computer-readable medium of claim 13, wherein the operations further comprise:
determining a first slot offset for a first slot that includes the aperiodic TRS, wherein the first slot offset is different than a second slot offset of the PDSCH signal; and
transmitting the aperiodic TRS in the first slot.

16. The non-transitory computer-readable medium of claim 13, wherein the operations further comprise:

using a Media Access Control (MAC) Control Element (CE) to activate a semi-persistent (SP)-TRS, wherein a minimal periodicity of the SP-TRS is less than or equal to that of a periodic TRS;

determining based on a second uplink reference signal received from the UE, that a second Doppler offset has satisfied a second threshold; and based on the determination that the second threshold is satisfied, using the MAC CE to deactivate the SP-TRS.

17. The non-transitory computer-readable medium of claim 13, wherein operations further comprise:

using a Media Access Control (MAC) Control Element (CE) or a Downlink Control Information (DCI) to lower the periodicity of a periodic TRS;

determining based on a second uplink reference signal received from the UE, that a second Doppler offset has satisfied a second threshold; and based on the determination that the second threshold is satisfied, using the MAC CE or DCI to raise the periodicity of the periodic TRS.

18. The non-transitory computer-readable medium of claim 13, wherein operations further comprise:

determining a slot offset for a slot that includes the aperiodic TRS, wherein the slot offset is determined by that of the PDSCH signal.

19. The non-transitory computer-readable medium of claim 13, wherein operations further comprise:

transmitting a second consecutive slot that includes one or more aperiodic TRSs; and receiving a HARQ-ACK signal based on a last symbol of the PDSCH signal.

20. The method of claim 8, further comprising:

using a Media Access Control (MAC) Control Element (CE) to activate a semi-persistent (SP)-TRS, wherein a minimal periodicity of the SP-TRS is less than or equal to that of a periodic TRS;

determining based on a second uplink reference signal received from the UE, that a second Doppler offset has satisfied a second threshold; and based on the determination that the second threshold is satisfied, using the MAC CE to deactivate the SP-TRS.

* * * * *